J. ZANOLLI.
TROLLEY GUARD.
APPLICATION FILED JUNE 2, 1914.
1,155,695.
Patented Oct. 5, 1915.
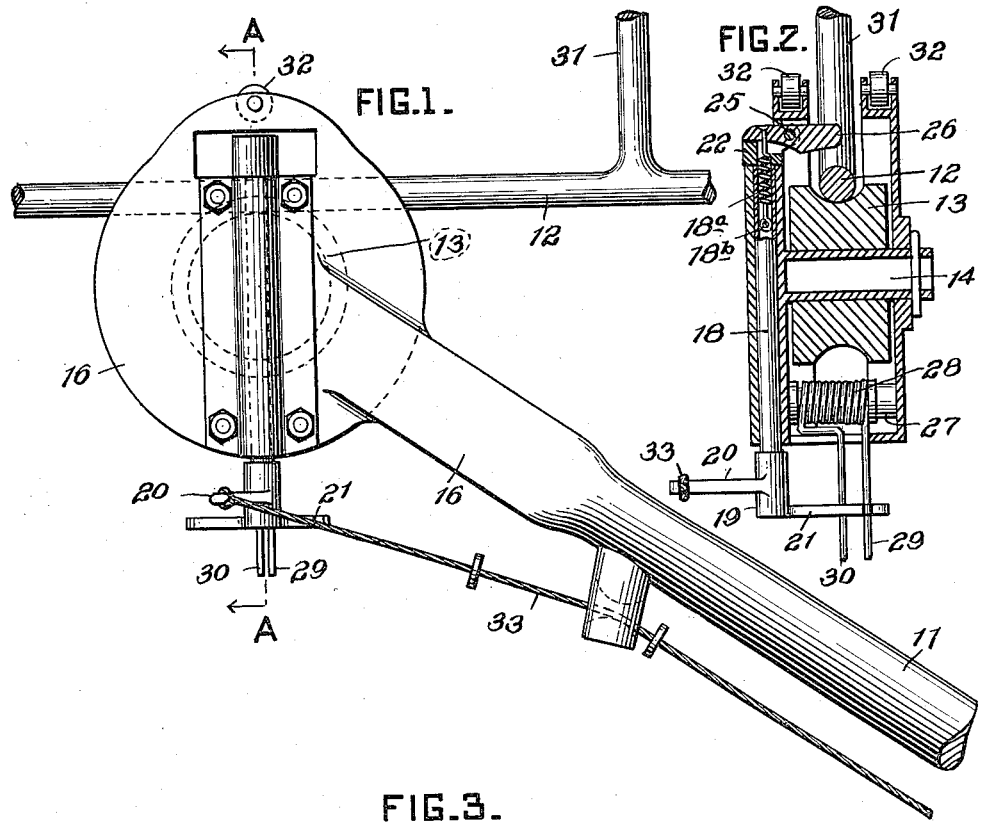
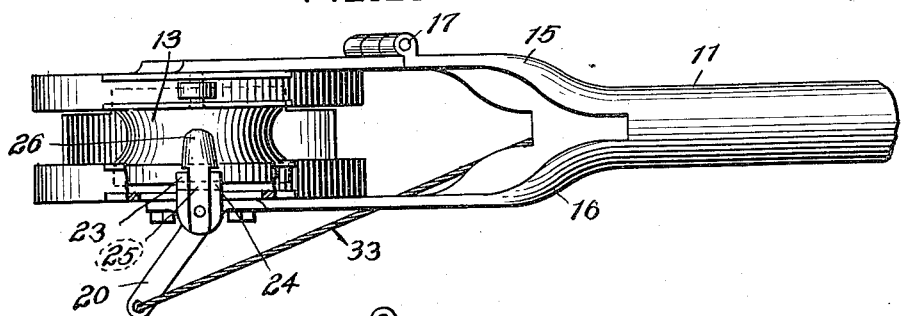
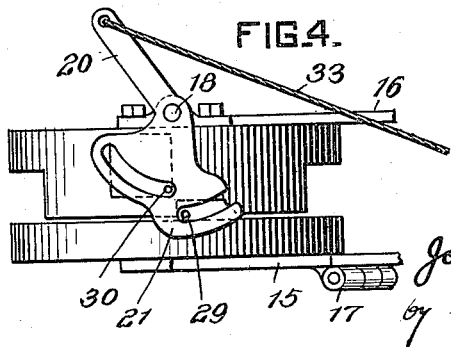
WITNESSES
J. Herbert Bradley.
Jo. Boily Brown
INVENTOR:
Joseph Zanolli
by F.W.H.Clay.
his atty.

UNITED STATES PATENT OFFICE.

JOSEPH ZANOLLI, OF PITTSBURGH, PENNSYLVANIA.

TROLLEY-GUARD.

1,155,695.

Specification of Letters Patent.

Patented Oct. 5, 1915.

Application filed June 2, 1914. Serial No. 842,421.

*To all whom it may concern:*

Be it known that I, JOSEPH ZANOLLI, a subject of the King of Italy, residing at Pittsburgh, in the State of Pennsylvania, United States of America, have invented a certain new and useful Trolley-Guard, of which the following is a specification.

My invention relates to that class of devices which constitute the bearings for a trolley wheel which is in contact with an overhead wire. And the particular object of my invention is to provide means whereby the trolley wheel may be readily put into normal position on the wire, may be as easily removed, which will allow free passage in either direction of brackets supporting the wire, and which will in addition prevent the accidental disconnection of the wheel and wire.

These objects I attain by means of apparatus such as that illustrated in the drawings, wherein—

Figure 1 is an elevation of the general arrangement of all the parts in normal operating position; Fig. 2 is a vertical cross section through the parts on the line A A of Fig. 1; Fig. 3 is a plan view; Fig. 4 is an under-side view.

In ordinary electric motor cars the power is transmitted through an overhead wire, drawn off by a grooved wheel in contact from underneath, down a "pole" to the motor, etc. Owing to irregularities of tracks, curves, and other causes, there is difficulty by reason of the rebounding of the trolley pole, and consequent disconnection of the wheel and wire. Of course, this shuts off the power and the car is stopped until the pole is pulled down and the groove of the trolley wheel again placed under the trolley wire.

I propose to obviate this difficulty by providing a fork extending upward on each side of the trolley wheel, with a finger extending across this fork forming a guard, or gate, which is locked against outward opening. This gate is made to rotate backward and forward to allow passage of supports for the wire.

The details of construction of my device are as follows: The trolley pole 11 is connected to the top of the car, and transmits current from the wire 12, through the trolley wheel 13, and its axle 14. The pole is divided into a fork having the branches 15 and 16, which hold the axle of the trolley wheel, and which may be widened out to form plates a little larger than the wheel. The fork branch 15 has a hinge 17, for obvious convenience in assembling or repair.
Now, referring to Fig. 2, on the outside of the branch 16, I mount a rotatable shaft 18, which has fixed at its lower end a crank member 19, having two branches, 20 and 21. At the top this shaft is supported by shoulder 22. The portion above this shoulder is divided and extended inward in branches 23 and 24, (Fig. 3). By a pin 25 through these branches the guard finger 26 is mounted. In normal position of the guard finger, its outer end rests on the shoulder portion 22 of the shaft 18, so that the finger is locked against movement of its inner end upward beyond the horizontal position shown. Inside the shaft 18 a small coil spring 18ᵃ is provided, which is attached to a pin 18ᵇ running through the shaft, and to the outer end of the guard finger, so as to exert a constant tension downward thereon. This maintains the outer end of the guard finger seated under tension normally, but the spring is extensible so that the inner end of the guard finger can be depressed to a nearly vertical position of the finger. The shaft 18 bearing the guard finger is free to rotate in its bearing. On a pin 27 through the guard branches 15 and 16, I mount a coil spring 28, which has its ends 29 and 30 extended downward to engage crank arm 21, on opposite sides thereof. In normal position the spring retains the shaft in such position that the guard finger fixed thereon is parallel to the axle of the trolley wheel. But by overcoming this spring pressure in either direction the (shaft and) guard finger may be turned backward or forward.

By this construction the guard finger 26 may admit the trolley wire either by lateral movement, or, when the trolley pole is raised, the wire presses down on the guard finger, overcomes the spring resistance, and the guard opens inward to admit the wire, immediately afterward springing up to normal locking position. The guard is absolutely prevented from opening upward, and therefore the rebounding of the pole does not detach the wheel from the wire. When the device comes to one of the supports 31 of the wire, the guard finger turns back or forward, according to the direction of progress, allowing the support to pass through. Small rollers 32 are provided as is usual, their purpose being to prevent friction when the trolley device passes under a fixed overhead support, such as a bridge floor. A cord 33 is attached to the crank arm 20, and this cord runs down to the end of the car, furnishing the means for lowering the trolley pole. When this cord is pulled, force is applied through crank arm 20 to turn the shaft 18, and so moves the guard finger out of locking position and allows the device to be freely removed from the wire.

Having thus described and illustrated my invention, I claim:

1. A trolley guard comprising a pole provided with a pair of plates forming a forked frame for the trolley wheel, a trolley wheel journaled therein, a pivoted guard finger mounted therein above the trolley wheel and below the top of said forked frame, and adapted to move inward to admit the trolley wire and laterally in both directions to permit the passage of a stay wire, said finger being supported on a horizontal pivot at the top of a rotatable shaft mounted on the frame and provided at its bottom with a laterally extending finger, a spring to normally retain said finger and vertical shaft in position, and a spring on the said vertical shaft engaging the finger to hold it in normal horizontal position, substantially as described.

2. In a trolley guard, the combination with a forked frame having two leaves to support the trolley wheel, and provided at the top with contact rollers, a vertical shaft mounted on one side of said frame and held in normal position by springs in the frame, a guard finger pivoted to the top of said shaft for vertical motion and held normally in position by a spring in the shaft, whereby said finger is adapted to be depressed to admit the trolley wire, and to be turned sidewise with the said vertical shaft to permit the passage of the supports of the trolley wire, the said finger being entirely located within the trolley frame and below the top of the frame, and means to open the guard finger by rotating the vertical shaft, substantially as described.

In testimony whereof, I have hereunto signed my name in the presence of the two subscribing witnesses.

JOSEPH ZANOLLI.

Witnesses:
  Jo. BAILY BROWN,
  FREDK. STAUB.

Copies of this patent may be obtained for five cents each, by addressing the "Commissioner of Patents, Washington, D. C."